(12) United States Patent
Wang et al.

(10) Patent No.: US 9,705,166 B2
(45) Date of Patent: Jul. 11, 2017

(54) HIGH-POWER ALUMINUM-AIR BATTERY SYSTEM

(71) Applicant: ADVANCED HIGH POWER MULTI SOURCE ENERGY SCIENCE-TE, Deyang, Province Sichuan (CN)

(72) Inventors: Wei Wang, Tianjin (CN); Yanling Qi, Tianjin (CN)

(73) Assignee: ADVANCED HIGH POWER MULTI (ACT/XE) SOURCE ENERGY SCIENCE-TECH CO., LTD., Deyang (CN)

( * ) Notice: Subject to any disclaimer, the term of this patent is extended or adjusted under 35 U.S.C. 154(b) by 227 days.

(21) Appl. No.: 14/387,224

(22) PCT Filed: Mar. 28, 2013

(86) PCT No.: PCT/CN2013/073317
§ 371 (c)(1),
(2) Date: Sep. 22, 2014

(87) PCT Pub. No.: WO2013/152670
PCT Pub. Date: Oct. 17, 2013

(65) Prior Publication Data
US 2015/0050568 A1    Feb. 19, 2015

(30) Foreign Application Priority Data

Apr. 10, 2012   (CN) .......................... 2012 1 0102835

(51) Int. Cl.
*H01M 12/06*   (2006.01)
*H01M 8/04276*  (2016.01)
*H01M 12/02*   (2006.01)
*H01M 12/08*   (2006.01)

(52) U.S. Cl.
CPC ..... *H01M 12/065* (2013.01); *H01M 8/04276* (2013.01); *H01M 12/02* (2013.01); *H01M 12/06* (2013.01); *H01M 12/08* (2013.01)

(58) Field of Classification Search
CPC ..... H01M 12/04; H01M 12/065; H01M 12/08
See application file for complete search history.

(56) References Cited

U.S. PATENT DOCUMENTS 5,093,213 A * 3/1992 O'Callaghan ........... H01M 2/40
429/120
2012/0293110 A1* 11/2012 Frederick ................ H01M 4/46
320/101

* cited by examiner

*Primary Examiner* — Nicholas P D'Aniello
(74) *Attorney, Agent, or Firm* — PROI Intellectual Property US

(57) ABSTRACT

A high-power aluminum-air battery system, which is battery pack electrically connected by at least two single aluminum-air batteries in series or parallel, bottom of the battery pack is provided with two liquid flow handling chambers, and upward side of the battery pack is provided with liquid distributing apparatus, the single aluminum-air batteries are interlinked with the liquid flow handling chambers via the respective liquid outlet pipes, the liquid flow handling chambers are interlinked with the pump liquid chamber via their respective liquid transmission pipes, the pump liquid chamber is interlinked with the liquid flow pump via the liquid sucking pipe, and the liquid delivery pipe of the liquid flow pump is interlinked with the liquid distributing apparatus, the liquid distributing apparatus is interlinked with the single aluminum-air batteries under it via liquid inlet pipes.

11 Claims, 8 Drawing Sheets

HIGH-POWER ALUMINUM-AIR BATTERY SYSTEM

CROSS REFERENCE TO RELATED APPLICATIONS

The present application is the US national stage of International Patent Application PCT/CN2013/073317 filed on Mar. 28, 2013, which, in turn, claims priority to Chinese Patent Application CN201210102835.9 filed on Apr. 10, 2012.

TECHNICAL FIELD

The present disclosure is generally related to a device directly converting chemical energy into electric energy and, more especially, is related to a metal fuel cell taking aqueous solution as electrolyte.

BACKGROUND

Aluminum-air battery is a late-model high-energy chemical power source, which takes aluminum alloy as negative electrode, air electrode as positive electrode, neutral or alkaline aqueous solution as the electrolyte. The battery outputs electric energy in the running course by consuming the aluminum alloy cathode and oxygen in air. Aluminum-air battery can run without battery charging. During the running process, the battery can keep continuous running by supplementing the consumed aluminum alloy negative electrode. Therefore, it is also known as metal fuel cell. Neutral aluminum-air battery takes saline solution or seawater as electrolyte, alkaline aluminum-air battery takes sodium hydroxide or potassium hydroxide aqueous solution as electrolyte.

The early disclosed Chinese patent, with its patent number of 91109160.2 and title of "Neutral Aluminum-Air Battery and Its Preparation Method", has disclosed a battery pack constituted by two single batteries. The battery pack is a sealed structure, but reaction sediment generated in the process of running fails to be removed constantly. Another early disclosed Chinese patent, with its patent number of 99251233.5 and title of "Aluminum-Air Battery", has disclosed the structure of an aluminum-air battery. The structure adopts overall combined fence-type negative electrode, convenient for replacement. In the meantime, combined fence-type negative electrode can be removed from the liquid level of the electrolyte, so as to avoid consumption of anode due to self-discharge, and the circular flowing electrolyte can scour the surface of the aluminum plate, so as to avoid the reaction sediment from shielding the aluminum plate. Nevertheless, during operation, voltage of the battery is low due to only one battery chamber, and reaction sediment is difficult to be removed from the electrolyte, for it is flowing inside of the battery.

CONTENTS OF THE INVENTION

The present disclosure is intended to solve the technical issues, so as to present a high-power aluminum-air battery system and its liquid flow method by means of avoiding the deficiencies of the conventional technologies, and to solve the problems of the existing technologies-sediment of the aluminum-air battery is difficult to be removed, short circuit of liquid flow among single batteries in the battery pack and liquid flow temperature control, etc.

Technical proposal proposed by the present disclosure, so as to solve the above technical issues, is a high-power aluminum-air battery system comprising single aluminum-air batteries, while there are at least two single aluminum-air batteries which are electrically connected in series or parallel to form battery pack; there are two liquid flow handling chambers under the battery pack, upward side of the battery pack is liquid distributing apparatus, the single aluminum-air batteries are interlinked with the liquid flow handling chambers via respective liquid outlet pipes; the liquid flow handling chambers are interlinked with a pump liquid chamber via their respective liquid conveying pipes; the pump liquid chamber is interlinked with the liquid flow pump via a liquid sucking pipe; a liquid delivery pipe of the liquid flow pump is interlinked with the liquid distributing apparatus; the liquid distributing apparatus is interlinked with the single aluminum-air batteries under it via liquid inlet pipes; during the process of the system running, adjusting the switches of the liquid outlet pipes which are connected with the liquid flow handling chambers respectively, control the electrolyte of the battery pack to flow into one of the liquid flow handling chambers alternately, and the electrolyte circulates among one of the liquid flow handling chambers, the pump liquid chamber, liquid distributing apparatus and the battery pack, while the other liquid flow handling chamber is in the process of electrolyte standing and sediment sedimentation treatment; electric energy output ends at the outer side of the battery pack are respectively interlinked with air electrode collector plates and the aluminum alloy electrode collector plates of the battery pack, and supply power outward.

The liquid flow handling chambers possess a totally symmetrical structure, and are respectively set with heating/cooling pipes for heating or cooling the electrolyte; lower parts of the liquid flow handling chambers are respectively set with sediment drain pipes carried with switches, bottoms of the shell of the liquid flow handling chambers are set with tilting structure enabling the sediment to slide to one side of the sediment drain pipes.

The pump liquid chamber is set with leaner inlet pipe and outlet pipe with switches. The liquid distributing apparatus comprises a liquid distributing tank, an upper cover matched with the liquid distributing tank, and a liquid level display which is located at outer side of the liquid distributing tank shell, for displaying the status of the liquid level in the liquid distributing tank; the liquid distributing tank is of bathtub construction, central part of which is provided with up and down pass-through hollow windows, and the periphery of which is a tank channel; all liquid inlet pipes interlinked with the single batteries are at the bottom of the tank channel; the liquid delivery pipe of the liquid flow pump is interlinked with the tank channel; lower surface of the upper cover is provided with a circular convex ridge which matches with the hollow windows of the liquid distributing tank, when the upper cover covers the liquid distributing tank, the convex ridge just covers or embedded into the hollow windows of the liquid distributing tank, constituting a hydrogen transmission channel; voltage-current adjuster, voltage-current display and electric energy output ends at the outer side of the liquid distributing apparatus are linked respectively with the aluminum alloy electrode collector plates and air electrode collector plates of the battery pack at the bottom of the liquid distributing tank via the conductively connected parts in the liquid distributing tank; hydrogen produced in the single batteries exhausts from the air outlet which is set on the upper cover via the hydrogen transmission channel constituted by hollow windows of the liquid distributing tank and the convex ridge of the upper cover.

The single battery has cavity structure, comprising a liquid inlet cutting chamber, battery reaction chamber and liquid outlet cutting chamber separated to each other, electrolyte in the liquid distributing apparatus flows into the liquid inlet cutting chamber via the liquid inlet pipes, then flows into the battery reaction chamber via the liquid inlet pipe under the liquid inlet cutting chamber; a rotatable liquid inlet cutter which is of lattice structure is installed at the upward side of the liquid inlet cutting chamber and the place where electrolyte of the liquid inlet pipes inflow, electrolyte flowing into the cutting chamber is just infused onto the grid of the rotatable liquid inlet cutter, cut off by the grid of the liquid inlet cutter and then inflows; at least one side wall of the battery reaction chamber is air electrode, constituting electrode group with aluminum alloy electrodes in the battery reaction chamber, the aluminum alloy electrodes are embedded in locating slots of the battery reaction chamber; the aluminum alloy electrodes and air electrodes are respectively connected with the aluminum alloy electrode collector plates and air electrode collector plates of the battery pack, hydrogen produced enters the hydrogen transmission channel of the liquid distributing apparatus via the upper exposure of the battery reaction chamber and is exhausted outward; the battery reaction chamber and the liquid outlet cutting chamber are separated by an inner separation wall, upper end of the inner separation wall is retained with an overflow slot enabling the two chambers to be interlinked; the liquid outlet cutting chamber is separated by a horizontal partition into upper and lower zone: confluence zone and liquid outlet zone, the horizontal partition is set with a confluence pipe unblocked downward; electrolyte in the battery reaction chamber flows into the confluence zone via the overflow slot, and flows into the liquid outlet zone via the confluence pipe; bottom of the liquid outlet zone is provided with the liquid outlet pipe, which is interlinked with the two liquid flow handling chambers; a liquid outlet cutter which is rotatable and of lattice structure is installed in the liquid outlet zone and under the orifice of the confluence pipe, electrolyte flowing out from the confluence pipe is just infused onto the grid of the liquid outlet cutter, namely, the electrolyte is cut off by the grid of the liquid outlet cutter and flows into the liquid outlet zone.

Bottom of the battery reaction chamber can also be big-end-up prism-shaped cavity with n sides, both sides and undersurface of the prismatic cavity are embedded with air electrodes; the battery reaction chamber is embedded with aluminum alloy electrodes, which are in one-to-one correspondence with the air electrodes of all side walls in the battery reaction chamber, forming multi group electrode groups; the aluminum alloy electrodes face one side of the air electrodes corresponding to them. Both of the liquid inlet cutter and liquid outlet cutter are carried with revolving shaft, which can turn on their own under the impact of electrolyte, so as to cut off the passed electrolyte flow; or the both are controlled by a circuit to turn on or off, so as to cut off the passed electrolyte flow.

Ports of liquid outlet pipes of the liquid flow handling chambers are provided with liquid flow baffles, numbers of connecting poles of the baffles are connected with the liquid outlet pipes, and all connecting poles have a space to each other, electrolyte in the liquid outlet pipes flow out from gaps between the connecting poles.

There is one or multi groups of aluminum alloy electrodes and air electrodes in the battery reaction chamber; when it occurs to the latter case, aluminum alloy electrodes and air electrodes are respectively connected in series or parallel, then electrically connected to the aluminum alloy electrode collector plate and air electrode collector plate respectively.

Leaner outlet pipe is connected to the liquid inlet pipes between the liquid inlet cutting chamber and battery reaction chamber, and the leaner outlet pipe is installed with leaner outlet switch.

The liquid outlet pipe of the liquid outlet cutting chamber is also connected with leaner outlet pipe, and the leaner outlet pipe is installed with leaner outlet switch.

Another technical proposal presented by the present disclosure so as to solve the above technical issues is providing liquid flow method for a high-power aluminum-air battery system, the high-power aluminum-air battery system is a battery pack electrically connected by at least two single aluminum-air batteries in series or parallel, bottom of the battery pack is provided with two liquid flow handling chambers, and upward side of the battery pack is provided with liquid distributing apparatus, the single aluminum-air batteries are interlinked with the liquid flow handling chambers via respective liquid outlet pipes, the liquid flow handling chambers are interlinked with the pump liquid chamber via their respective liquid transmission pipes; the pump liquid chamber is interlinked with the liquid flow pump via the liquid sucking pipe, liquid delivery pipe of the liquid flow pump is interlinked with the liquid distributing apparatus, the liquid distributing apparatus is interlinked with the single aluminum-air batteries under it via the liquid inlet pipes, electric energy output ends at the outer side of the battery pack are respectively interlinked with the air electrode collector plates and aluminum alloy electrode collector plates of the battery pack, and supply power source outward, liquid flow method of the aluminum-air battery system is: electrolyte infused into the liquid flow handling chamber flows into the pump liquid chamber via the liquid transmission pipes; the electrolyte in the pump liquid chamber is drawn by the liquid flow pump via the liquid sucking pipe, then pumped into the liquid distributing apparatus via the liquid delivery pipe; electrolyte in the liquid distributing apparatus flows into the single batteries via liquid outlet pipes, flows to one of the two liquid flow handling chambers via liquid outlet pipes of single batteries, and circulates among the liquid flow handling chamber, pump liquid chamber, liquid distributing apparatus and single batteries, while the other liquid flow handling chamber is in the process of electrolyte standing and sediment sedimentation treatment, moving in circles in such a way.

The step of sediment sedimentation treatment process includes eliminating sediment outward via the sediment drain pipes under the liquid flow handling chambers.

The step of the electrolyte in liquid distributing apparatus flows into single batteries via liquid outlet pipes also comprises the following steps:

The electrolyte flowing out from the liquid outlet pipes is firstly cut off by the rotating electrolyte cutter in a liquid inlet cutting chamber of the electrode chambers, flows into a liquid inlet cutting chamber, flows into the battery reaction chamber via the liquid inlet pipes, flows into the confluence zone via the overflow slot, electrolyte flows out from the confluence pipe is cut off by a rotating liquid outlet cutter and flows into the liquid outlet zone, then flows into the liquid flow handling chambers via the liquid outlet pipes.

The present disclosure also presents the cleaning method of a high-power aluminum-air battery system, the high-power aluminum-air battery system is a battery pack electrically connected by at least two single aluminum-air batteries in series or parallel; bottom of the battery pack is provided with two liquid flow handling chambers, and upward side of the battery pack is provided with liquid distributing apparatus; the single aluminum-air batteries are interlinked with the liquid flow handling chambers via the respective liquid outlet pipes; the liquid flow handling chambers are interlinked with the pump liquid chamber via their respective liquid transmission pipes; the pump liquid chamber is interlinked with the liquid flow pump via the liquid sucking pipe, and the liquid delivery pipe of the liquid flow pump is interlinked with the liquid distributing apparatus; the liquid distributing apparatus is interlinked with the single aluminum-air batteries under it via the liquid inlet pipes; electric energy output ends at the outer end of the battery pack are respectively interlinked with the air electrode collector plates and aluminum alloy electrode collector plates of the battery pack, and supply power outward; wash the interior of the system when it stops running; and the following steps shall be implemented:

A. Turn on sediment drain pipe switches of the liquid flow handling chambers as well as the switch of the pump liquid chamber leaner outlet pipe of the pump liquid chamber, enabling electrolyte in the battery system to be drained, then turn off the switches.

B. Turn on the switch of the leaner inlet pipe of the pump liquid chamber, infuse leaner from the leaner inlet pipe of the pump liquid chamber, leaner in the pump liquid chamber is drawn by the liquid flow pump via the liquid sucking pipe, and pumped into the liquid distributing apparatus via the liquid delivery pipe for cleaning, later, leaner flows into the single batteries via liquid outlet pipes of the liquid distributing apparatus, cleaning interior of the single batteries; control switches of the liquid outlet pipes of the single batteries, so as to control the leaner to flow into the liquid flow handling chambers, cleaning the liquid flow handling chambers respectively; later, leaner enters the pump liquid chamber via liquid transmission pipe of the liquid flow handling chambers, under the action of the liquid flow pump, leaner circulates in the overall system till completion of cleaning.

C. Turn off the liquid flow pump, drain leaner in the pump liquid chamber from leaner outlet pipe of the pump liquid chamber; turn on sediment drain pipe switches and leaner outlet switches, drain leaner in the liquid flow handling chambers and electrode chamber respectively from the sediment drain pipes and leaner outlet pipes of the liquid flow handling chambers, completing cleaning of the whole aluminum-air battery system.

The aluminum-air battery system can be cleaned only by one of the liquid flow handling chambers.

In the battery pack of the high-power aluminum-air battery system, single batteries have independent liquid inlet cutting chamber and liquid outlet cutting chamber, this unique electrolyte cut off structure has effectively solved short-circuit problem among single batteries in the aluminum-air battery pack; electrolyte circulating mode adopted by the battery structure has ensured the diffusion of ion at electrode surface during the high-power running of the aluminum-air battery system, immediate removal of by-product from the electrode surface, and subsequent automatic discharge of sediment; liquid flow distribution mode of the liquid distributing apparatus adopted by the battery structure as well as the configured liquid level display have ensured that electrolyte is distributed more evenly in single batteries at the same velocity, more favorable for the consistency of discharge performance of single batteries in the battery pack; in the battery structure, double liquid flow handling chambers is adopted, for liquid inlet of the liquid flow handling chambers, liquid flow baffles are set, and side plates and base plates of the liquid flow handling chambers are of oblique handling, assuring rapid subsidence and immediate discharge of the sediment in the electrolyte; temperature control device is set in the liquid flow handling chamber structure, ensuring the electrolyte temperature controllable; the specially set cleaning structure has assured safety and reliability of the system under long-term running, the adoption of the bottom slant cylindrical aluminum alloy electrodes and air electrodes relative to the slant bottom of the aluminum alloy electrodes can prolong the discharge time of the aluminum alloy electrodes greatly, thus prolong the running time of the system after one-time replenishing of aluminum alloy electrodes. Aluminum-air battery system structure presented by the present disclosure is appropriate for high-energy-density high-power aluminum-air battery system, which is safe and reliable, cost saving and pollution free, quite fit to be served as power battery, power station, emergency power supply and other high-power aluminum-air battery systems, with wide application area.

CONCRETE EXECUTIVE METHODS

Now, further instructions will be made by combining the preferable embodiments of the attached drawings.

Figure 1:
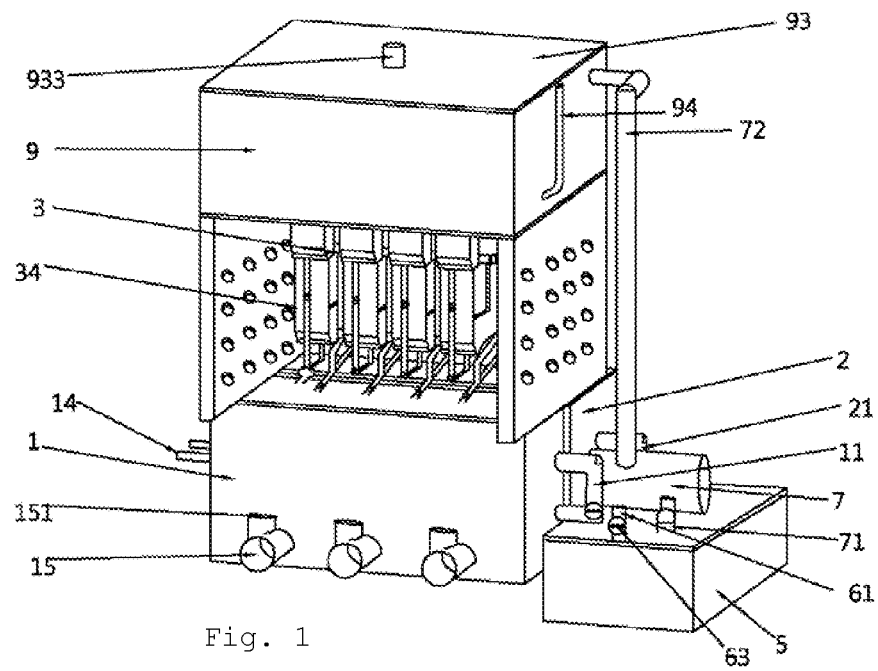
FIG. 1 is the preferable embodiment of the high-power aluminum-air batter system of the invention, and axonometric projection diagram viewed from the right side of the battery system.
Figure 2:
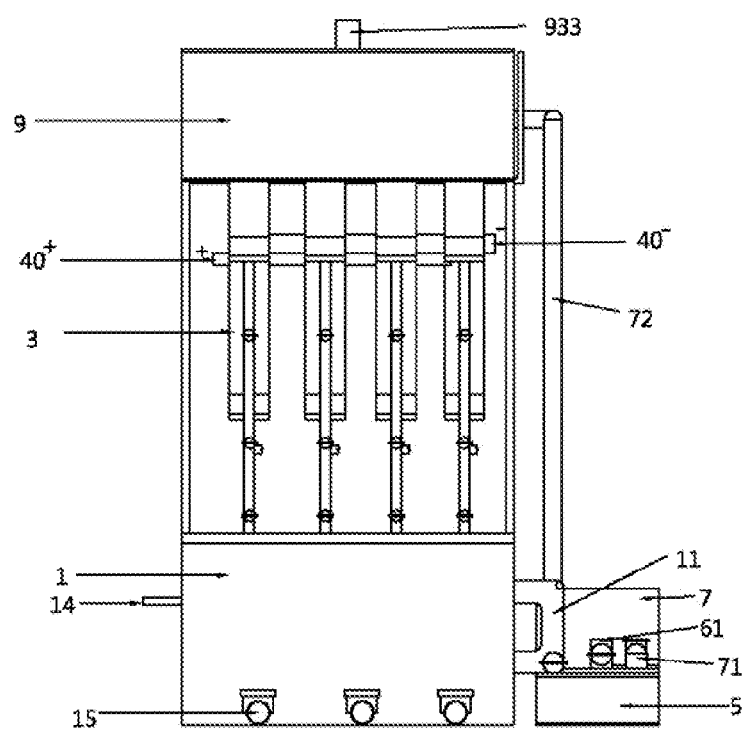
FIG. 2 is the front view diagram of the battery system of the preferable embodiment.
Figure 3:
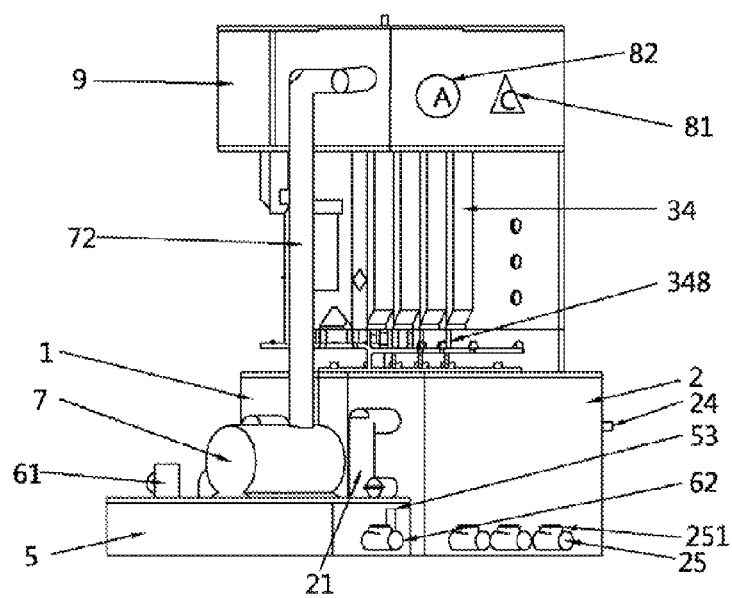
FIG. 3 is the axonometric projection diagram of the preferable embodiment battery system upon the removal of one side support plate of the battery pack.
Figure 4:
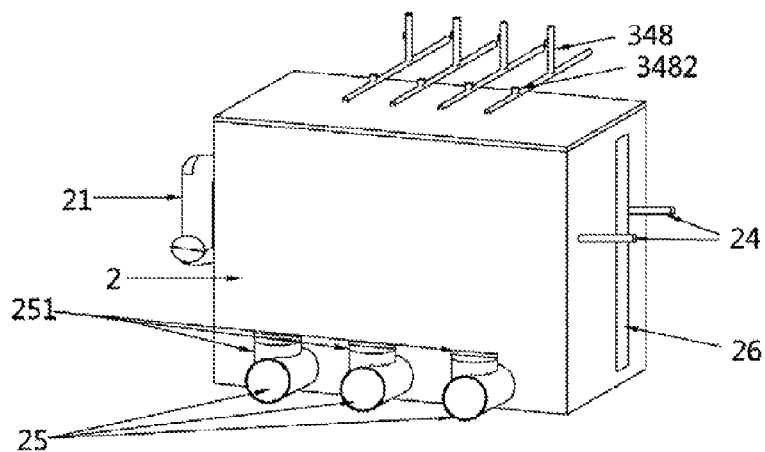
FIG. 4 is the axonometric projection diagram of the liquid flow handling chamber 2 of the preferable embodiment-battery system.
Figure 5:
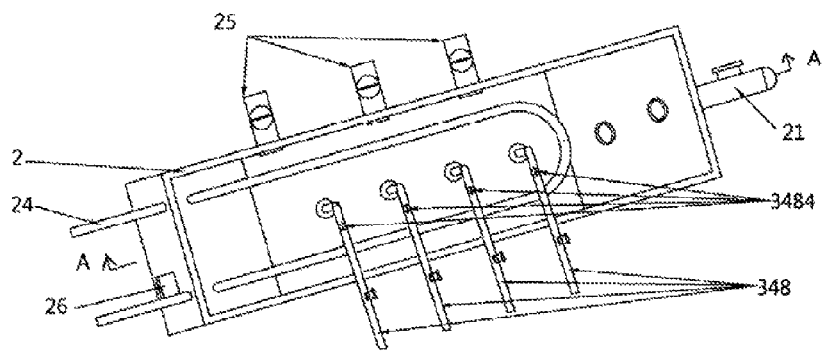
FIG. 5 is the axonometric projection diagram of the preferable embodiment-liquid flow handling chamber 2 viewing from top down.
Figure 6:
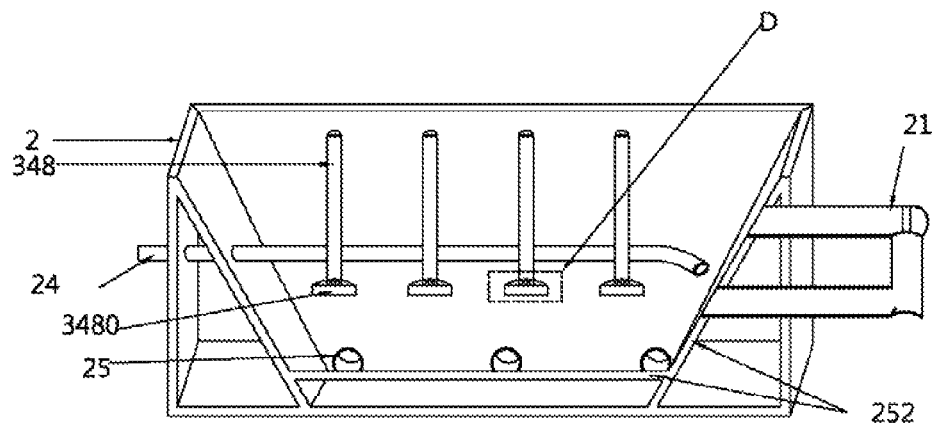
FIG. 6 is the axonometric projection diagram of the section view of section A-A of FIG. 5.
Figure 7:
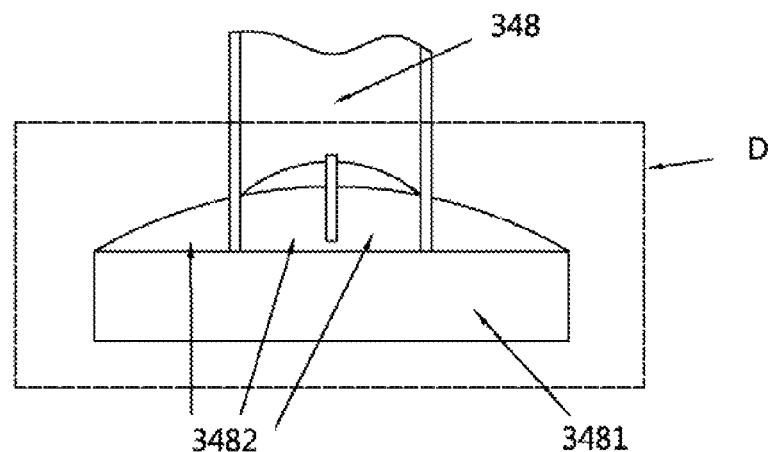
FIG. 7 is the amplified axonometric projection diagram of the part 6D of FIG. 6.
Figure 8:
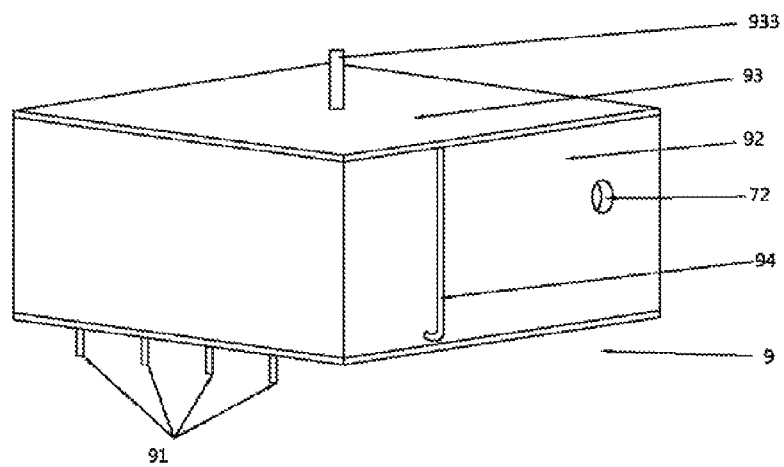
FIG. 8 is the axonometric projection diagram of the liquid distributing apparatus 9 of the preferable embodiment.
Figure 9:
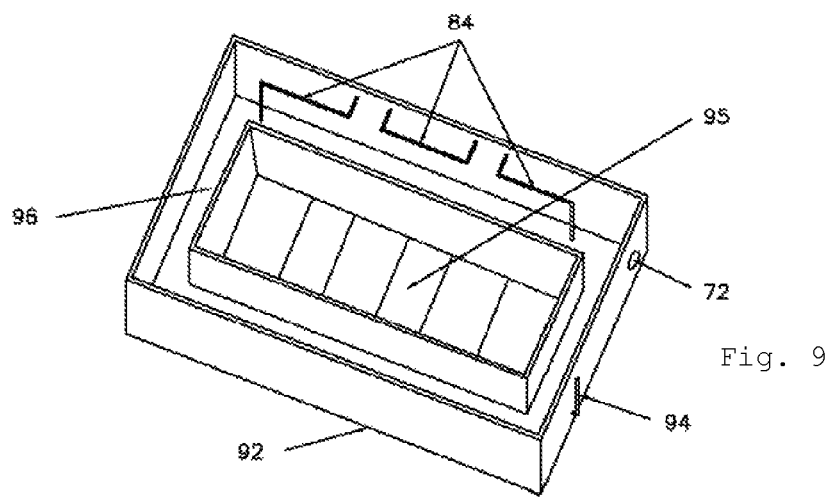
FIG. 9 is the axonometric projection diagram of the liquid distributing apparatus 9 upon removal of the upper cover 93.
Figure 10:
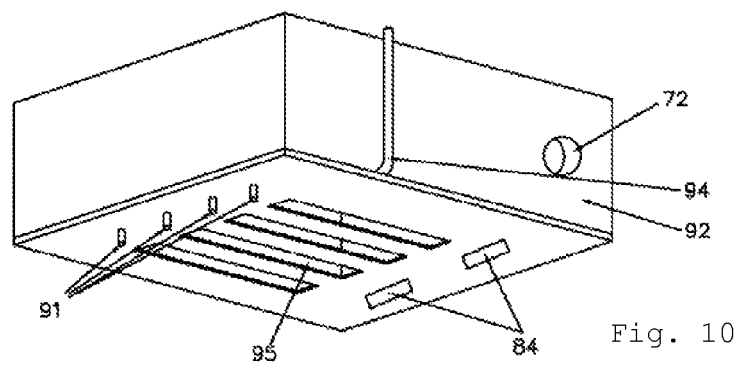
FIG. 10 is the axonometric projection diagram of the liquid distributing apparatus 9 looked up from the bottom.
Figure 11:
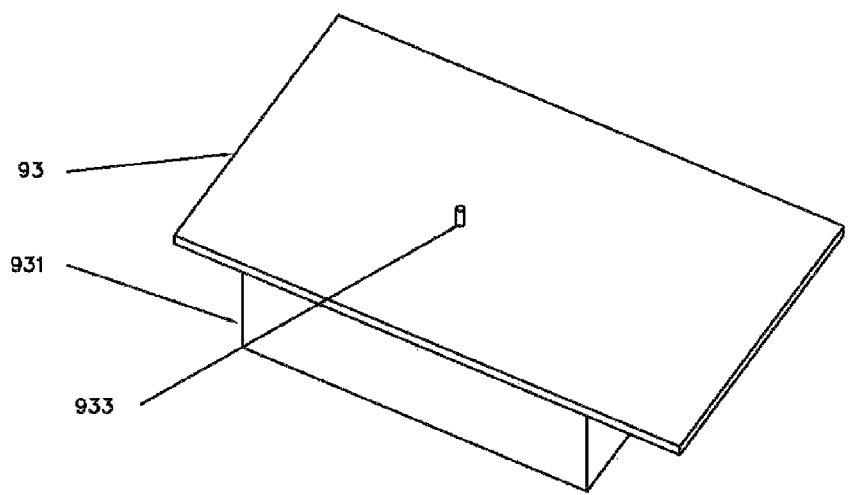
FIG. 11 is the axonometric projection diagram of the upper cover 93 of the liquid distributing apparatus 9.
Figure 12:
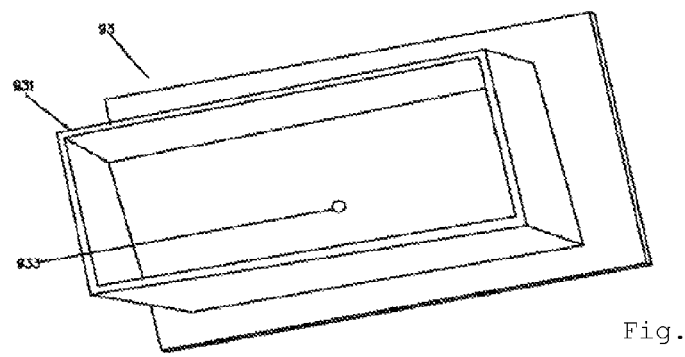
FIG. 12 is the axonometric projection diagram of the upper cover 93 of the liquid distributing apparatus 9 looked up from the bottom.
Figure 13:
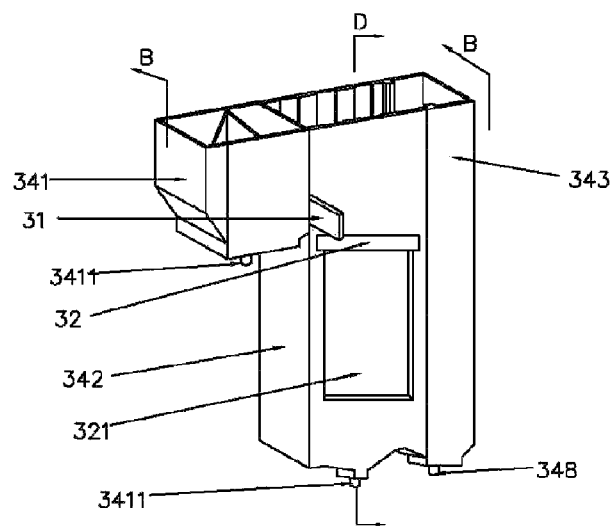
FIG. 13 is the axonometric projection diagram of the single battery 34.
Figure 14:
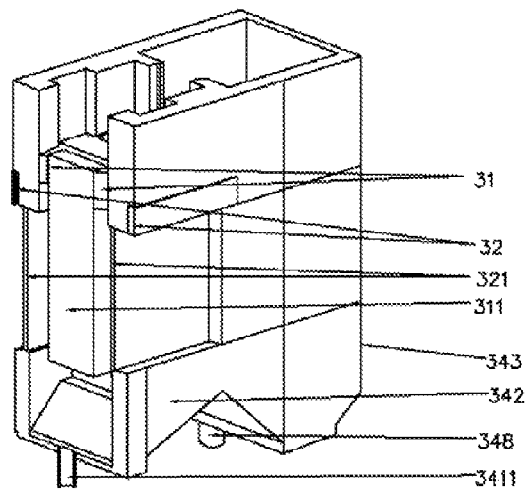
FIG. 14 is the sectional axonometric projection diagram of section D-D of FIG. 13.
Figure 15:
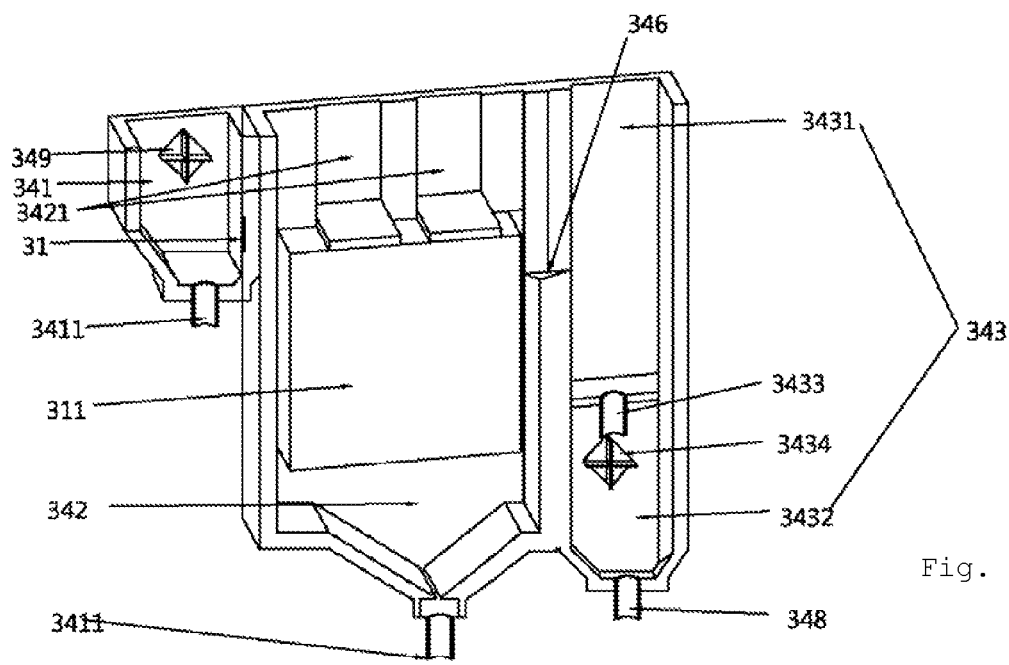
FIG. 15 is the sectional axonometric projection diagram of section B-B of FIG. 13.
Figure 16:
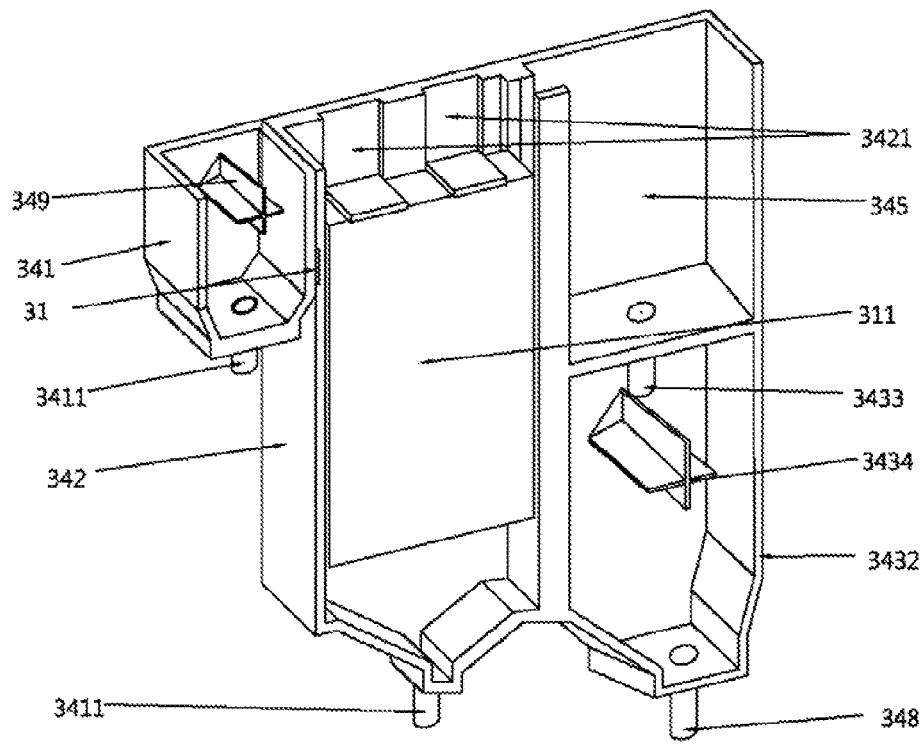
FIG. 16 is the axonometric projection diagram of interior structure of a single aluminum-air battery 34 upon removal of side plate.
Figure 17:
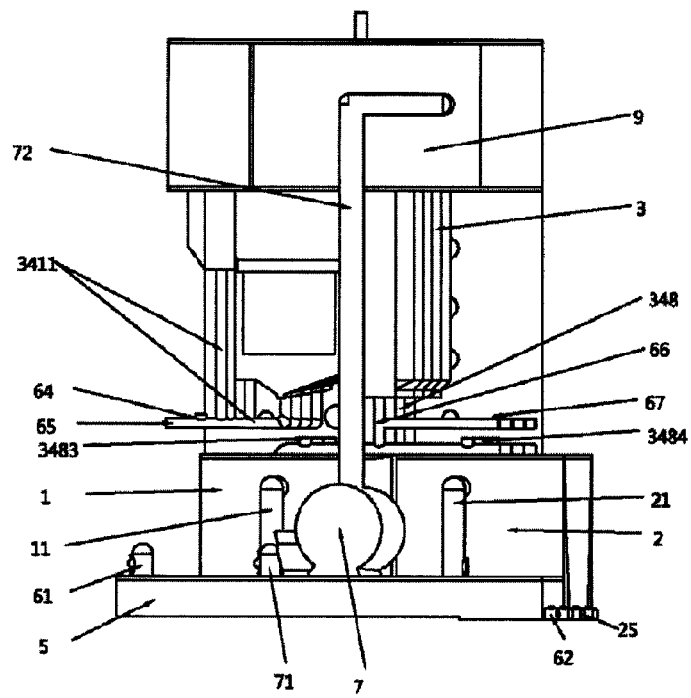
FIG. 17 is the axonometric projection diagram of the aluminum-air battery upon removal of one side support plate of the battery pack 3.

Preferable embodiment of the invention by referring to FIG. 1-FIG. 3 is: design and produce a high-power aluminum-air battery system, comprising single aluminum-air battery 34, especially, is at least two single aluminum-air batteries 34 electrically connected in series or parallel compose a battery pack 3; bottom of the battery pack 3 is provided with two liquid flow handling chamber 1 and 2, and upward side of the battery pack 3 is provided with liquid distributing apparatus 9; the single aluminum-air batteries 34 are interlinked with the liquid flow handling chamber 1 and 2 via respective liquid outlet pipes 348; the liquid flow handling chamber 1 and 2 are interlinked with a pump liquid chamber 5 via their respective liquid transmission pipe 11 and 21; the pump liquid chamber 5 is interlinked with a liquid flow pump 7 via a liquid sucking pipe 71, and a liquid delivery pipe 72 of the liquid flow pump 7 is interlinked with the liquid distributing apparatus 9; the liquid distributing apparatus 9 is interlinked with the single aluminum-air batteries 34 under it via liquid inlet pipes 91; in the process of the aluminum-air battery system running, adjust the switches of the liquid outlet pipes 348 which are connected with the liquid flow handling chamber 1 and 2 respectively, control electrolyte of the battery pack 3 to flow into one of the two liquid flow handling chambers alternately, and the electrolyte circulates among the liquid flow handling chamber 1 or 2, the pump liquid chamber 5, the liquid distributing apparatus 9 and the battery pack 3, while the other liquid flow handling chamber 2 or 1 is in the process of electrolyte standing and sediment sedimentation treatment. The battery system outputs electric energy via the electric energy output end 40+ and 40− at the battery pack 3, controlling the magnitude of the electric current or voltage output of the battery system by adjusting the current-voltage regulator 81 of the batter system. Current-voltage display 82 of the battery system is used for displaying the magnitude of the current and voltage output. During the running process, aluminum alloy electrodes 311 in the single batteries 34 of the battery system will dissolve continuously. A small amount of hydrogen generated during the continual dissolution of aluminum alloy electrodes 311 is output through the air outlet 933 on the upper cover 93 of the liquid distributing apparatus.

Refer to FIG. 3 to FIG. 7 and FIG. 17, structures of the liquid flow handling chamber 1 and 2 are totally symmetrical; the liquid flow handling chamber 1 and 2 are respectively set with heating/cooling pipe 14 and 24 for heating or cooling electrolyte, so as to control the electrolyte temperature during the running of the batter system. Bottom of the liquid flow handling chamber 1 and 2 are respectively set with sediment drain pipe 15 and 25 carried with switch 151 and 251, bottom of the liquid flow handling chamber 1 and 2 are set with tilting structure 252 enabling the sediment to slide to one side of the sediment drain pipe 15 and 25, so as to assure that sediment in the electrolyte can be smoothly discharged to the outside of the battery system via sediment drain pipes of the liquid flow handling chambers. Ports of liquid outlet pipes 348 of the liquid flow handling chambers are set with liquid flow baffles 3481 on which several connecting poles 3482 are connected with the liquid outlet pipes 348, all connecting poles 3482 have an interval to each other, and electrolyte in the liquid outlet pipes 348 flows out from the gaps among the connecting poles 3482. In the process of the high-power aluminum-air battery system running, to control electrolyte in the single aluminum-air batteries 34 to flow into liquid flow handling chamber 1 or 2 alternately by adjusting switch 3483 and 3484 on the liquid outlet pipes 348 of the single aluminum-air batteries 34 respectively, so as to assure that one of the two liquid flow handling chambers 1 or 2 is at electrolyte standing, sediment sedimentation and discharge treatment process, while the other chamber 2 or 1 is at the state of electrolyte cyclic process among single batteries 34, liquid flow handling chamber 2 (or liquid flow handling chamber 1), pump liquid chamber 5 and liquid distributing apparatus 9.

The pump liquid chamber 5 is set with pump liquid chamber leaner inlet pipe 61 which is carried with switch and pump liquid chamber leaner outlet pipe 62 which is carried with switch, for cleaning the pump liquid chamber 5 when the aluminum-air battery system stops running, leaner inflow and outflow are realized by controlling the pump liquid chamber leaner inlet pipe switch set on the pump liquid chamber leaner inlet pipe 61 and pump liquid chamber leaner outlet pipe switch set on the pump liquid chamber leaner outlet pipe 62.

Refer to FIG. 8 to FIG. 12, the liquid distributing apparatus 9 comprises a liquid distributing tank 92, an upper cover 93 which matches with the liquid distributing tank 92, and a liquid level display 94 which is at the outer side of the shell of the liquid distributing tank 92 for displaying level status of the liquid in the liquid distributing tank 92, observe level status of the liquid in the liquid distributing apparatus 9 via liquid level display 94 of the liquid distributing apparatus, accordingly regulating pressure of electrolyte of the liquid inlet pipes 91 of the liquid distributing apparatus; the liquid distributing tank 92 is of bathtub construction, central part of which is provided with up and down pass-through hollow windows 95, and periphery of which is tank channel 96; the liquid inlet pipes 91 interlinked with the single batteries 34 are located at the bottom of the tank channel 96; liquid delivery pipe 72 of the liquid flow pump 7 is interlinked with the tank channel 96; lower surface of the upper cover 93 is provided with a circular convex ridge 931 which fits with the hollow windows 95 of the liquid distributing tank 92, when the upper cover 93 covers the liquid distributing tank 92, the convex ridge 931 just covers or embedded into the hollow windows 95 of the liquid distributing tank 92, constituting hydrogen output channel; voltage and current regulator 81 and voltage and current display 82 at the outer side of the liquid distributing apparatus 9 are linked respectively with the aluminum alloy electrode collector plate 31 and air electrode collector plate 32 of the battery pack 3 at the bottom of the liquid distributing tank 92 via the conductively connected parts 84 in the liquid distributing tank 92; cover the conductively connected parts 84 inside of the liquid distributing apparatus 9 with corrosion resistant insulation material, enabling it to be isolated from the electrolyte. A small amount of hydrogen produced by the single batteries 34 exhausts from the air outlet 933 which is set on the upper cover 93 via the hydrogen transmission channel constituted by hollow windows 95 of the liquid distributing tank 92 and the convex ridge 931 of the upper cover 93.

Refer to FIG. 13 to FIG. 16, the single battery 34 has cavity structure, comprising a liquid inlet cutting chamber 341, battery reaction chamber 342 and liquid outlet cutting chamber 343 separate to each other; electrolyte in the liquid distributing apparatus 9 flows into the liquid inlet cutting chamber 341 via the liquid inlet pipes 91, then flows into the battery reaction chamber 342 via the liquid inlet pipe 3411 under the liquid inlet cutting chamber 341; a rotatable liquid inlet cutter 349 which is of lattice structure is installed at the upward side of the liquid inlet cutting chamber 341 and the place where electrolyte of the liquid inlet pipes 91 inflows; electrolyte flowing out from the liquid inlet pipes 91 is just infused onto the grid of the rotatable liquid inlet cutter 349, cut off by the grid of the liquid inlet cutter 349 and flows into the liquid inlet cutting chamber 341.

At least one side wall of the battery reaction chamber 342 is air electrodes 321, in this embodiment, the air electrodes 321 are installed on the front and rear frames of the shell of the single battery reaction chambers 342, constituting battery groups with aluminum alloy electrodes 311 in the battery reaction chamber 342, air electrodes 321 are isolated from the aluminum alloy electrodes 311 by electrolyte; the aluminum alloy electrodes 311 are embedded in the locating notches 3421 of the inner wall of the battery reaction chamber; the aluminum alloy electrodes 311 and air electrodes 321 are respectively electrically connected with the aluminum alloy electrode collector plates 31 and air electrode collector plates 32 of the battery pack 3, hydrogen produced during battery running enters the hydrogen transmission channel of the liquid distributing apparatus 9 via the upper exposure of the battery reaction chamber 342 and is exhausted outward.

The battery reaction chamber 342 and the liquid outlet cutting chamber 343 are separated by an inner separation wall 345, upper end of the inner separation wall 345 is retained with an overflow slot 346 enabling the two chambers to be interlinked; the liquid outlet cutting chamber 343 is separated by a horizontal partition into upper and lower zone: confluence zone 3431 and liquid outlet zone 3432, the horizontal partition is set with a confluence pipe 3433, which can pass through downward.

Electrolyte in the battery reaction chamber 342 flows into the confluence zone 3431 via the overflow slot 346, and then flows into the liquid outlet zone 3432 via a confluence pipe 3433; bottom of the liquid outlet zone 3432 is provided with the liquid outlet pipe 348, which is interlinked with the liquid flow handling chamber 1 and 2. A liquid outlet cutter 3434 which is rotatable and of lattice structure is installed in the liquid outlet zone 3432 and under the orifice of the confluence pipe 3433, electrolyte flowing out from the confluence pipe 3433 is just infused onto the grid of the liquid outlet cutter 3434, namely, the electrolyte is cut off by the grid of the liquid outlet cutter and flows into the liquid outlet zone 3432.

Both of the liquid inlet cutter 349 and liquid outlet cutter 3434 for cutting off electrolyte flow are carried with revolving shaft, which can turn on their own under the impact of the electrolyte, so as to cut off the passed electrolyte flow; or the both are controlled by circuit to turn on or off, so as to cut off the passed electrolyte flow.

There are appropriate intervals among the aluminum alloy electrodes 311 and air electrodes 321. There is one or multi groups of aluminum alloy electrodes 311 and air electrodes 321 in the battery reaction chamber 342; when it occurs to the latter case, all aluminum alloy electrodes 311 and air electrodes 321 are respectively connected in series or parallel, then electrically connected to the aluminum alloy electrode collector plates 31 and air electrode collector plates 32 respectively. Electrolyte enters the single battery reaction chamber 342 from the bottom of the single battery reaction chamber 342 via liquid inlet pipe 3411 of the single battery reaction chamber, passes through the gaps among aluminum alloy electrodes 311 and air electrodes 321, then flows into the liquid outlet cutting chamber 343 of the single batteries via overflow slot 346 of the single battery reaction chamber. During the running of the aluminum-air battery system, aluminum alloy electrodes 311 located in the single battery reaction chamber 342 and in the electrolyte present anodic dissolution reaction, and the surfaces of air electrodes exposed to the electrolyte present oxygen reduction reaction. Electric current generated from the above electrode reactions is output through the electric energy output ends 40$^+$ and 40$^-$ via aluminum alloy electrode collector plates 31 and air electrode collector plates 32.

Electrolyte flows into the confluence zone 3431 of the single battery liquid outlet cutting chamber 343 via the overflow slot 346 of the single battery reaction chamber, flows out via the confluence pipe 3433, then cut off by the electrolyte cutter 3434 of the single battery liquid outlet cutting chamber, avoiding short circuit among various single batteries in the aluminum-air battery system. Later, electrolyte enters liquid flow handling chamber 1 or 2 via single battery liquid outlet pipes 348. Circuit controlled on-off can also be adopted by the electrolyte cutter 349 in the liquid inlet cutting chamber 341 of single batteries as well as electrolyte cutter 3434 in the liquid outlet cutting chamber 343 of single batteries to cut off electrolyte flow. Positions of the electric energy output ends 40$^+$ and 40$^-$ can be set at different positions of the system as required.

In this embodiment, liquid flow method of the aluminum-air battery system is: electrolyte infused into the liquid flow handling chamber 1 or 2 flows into the pump liquid chamber 5 via the liquid transmission pipe 11 or 21; electrolyte in the pump liquid chamber 5 is drawn by the liquid flow pump 7 via the liquid sucking pipe 71, then pumped into the liquid distributing apparatus 9 via the liquid delivery pipe 72; electrolyte in the liquid distributing apparatus 9 flows into the single batteries 34 via liquid outlet pipes 91, flows to liquid flow handling chamber 1 or 2 via liquid outlet pipes 348 of all single batteries 34, and circulates among the liquid flow handling chamber 1 or 2, pump liquid chamber 5, liquid distributing apparatus 9 and single batteries 34, while the other liquid flow handling chamber 2 or 1 is in the process of electrolyte standing and sediment sedimentation treatment, moving in circles in such a way.

The step of sediment sedimentation treatment process includes eliminating sediment outward via the sediment drain pipe 25 or 15 under the liquid flow pass though chambers.

The step of the electrolyte in the liquid distributing apparatus 9 flow into single batteries 34 via liquid outlet pipes 91, it also comprises the following steps: the electrolyte flowing out from the liquid outlet pipes 91 is firstly cut off by the rotating electrolyte cutter 349 in the liquid inlet cutting chamber 341, flows into the liquid inlet cutting chamber 341, flows into the battery reaction chamber 342 via the liquid inlet pipe 3411, flows into the confluence zone 3431 via the overflow slot 346, electrolyte flowing out from the confluence pipe 3433 is cut off by the rotating liquid outlet cutter 3434 and flows into the liquid outlet zone 3432, then flows into the liquid flow handling chamber 1 or 2 via the liquid outlet pipes 348.

Leaner outlet pipe 65 is connected to the liquid inlet pipe 3411 between the liquid inlet cutting chamber 341 and battery reaction chamber 342, and the leaner outlet pipe 65 is installed with leaner outlet switch 64. The single battery liquid outlet pipes 348 are also connected with leaner outlet pipe 67, and the leaner outlet pipe 67 is installed with leaner outlet switch 66.

In this embodiment, after the aluminum-air battery system has run for some time, the whole system can be cleaned as required: drain electrolyte in liquid flow handling chamber 1 and liquid flow handling chamber 2 via their respective sediment drain pipe 15 and 25, and turn off the sediment drain pipe switch 151 and 251. Drain electrolyte in the pump liquid chamber from the leaner outlet pipe 62 of the pump liquid chamber, and turn off the leaner outlet switch of the pump liquid chamber. Turn on the switch of leaner inlet pipe 61 of the pump liquid chamber, leaner will flow from the leaner inlet pipe 61 of the pump liquid chamber, and under the action of the liquid flow pump 7, the leaner will enter the liquid distributing apparatus 9 via the liquid sucking pipe 72 of the liquid flow pump, cleaning the liquid distributing apparatus 9. Later, the leaner will enter the single batteries 34 via liquid outlet pipes 91 of the liquid distributing apparatus, cleaning the liquid inlet cutting chamber 341, battery reaction chamber 342 and liquid outlet cutting chamber 343 in the single battery 34. Control switch 3483 and 3484 of the liquid outlet pipes 348 of the single batteries, so as to control the leaner to flow into the liquid flow handling chamber 1 or 2, cleaning the two liquid flow handling chambers respectively. Later, the leaner will enter the pump liquid chamber 5 via liquid transmission pipe 11 of the liquid flow handling chamber 1 or liquid transmission pipe 21 of the liquid flow handling chamber 2. Under the action of the liquid flow pump 7, the leaner will circulate in the whole system till completion of cleaning. Later, turn off the liquid flow pump 7, drain the leaner in the pump liquid chamber 5 from the leaner outlet pipe 62 of the pump liquid chamber. Meanwhile, turn on sediment drain pipe switch 151 and 251, and leaner outlet switch 64 and 66, drain leaner in the liquid flow handling chamber 1, liquid flow handling chamber 2 and electrode chamber 34 respectively from the sediment drain pipes 15 and 25 of the liquid flow handling chamber 1 and 2 as well as leaner outlet pipe 65 and 67, completing cleaning of the whole aluminum-air battery system. The aluminum-air battery system can also be cleaned by only depending liquid flow handling chamber 1 or 2.

Figure 18:
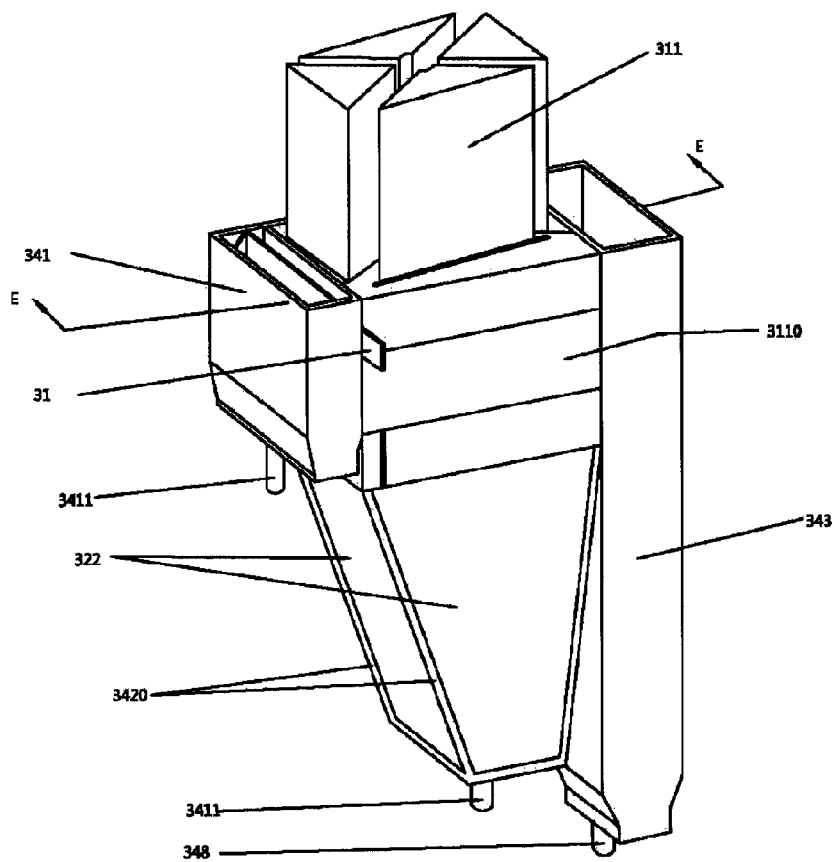
FIG. 18 is the axonometric projection diagram of the single aluminum-air battery 34 in the preferable embodiment adopting the bottom slant cylindrical aluminum alloy electrode 311.
Figure 19:
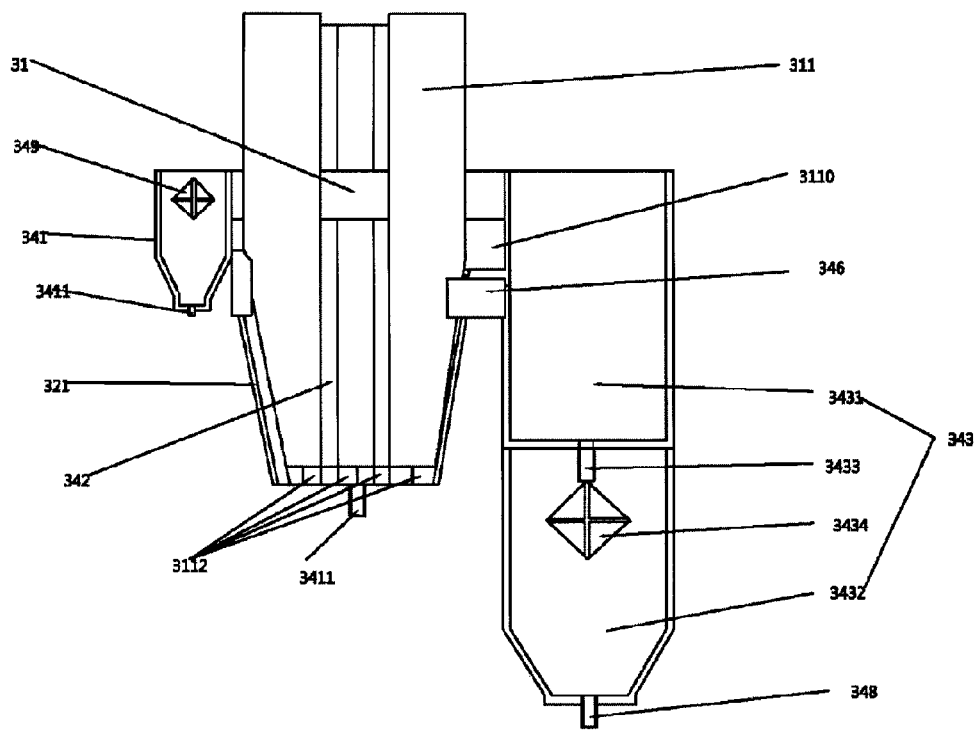
FIG. 19 is the sectional axonometric projection diagram of the section E-E of FIG. 18.
Figure 20:
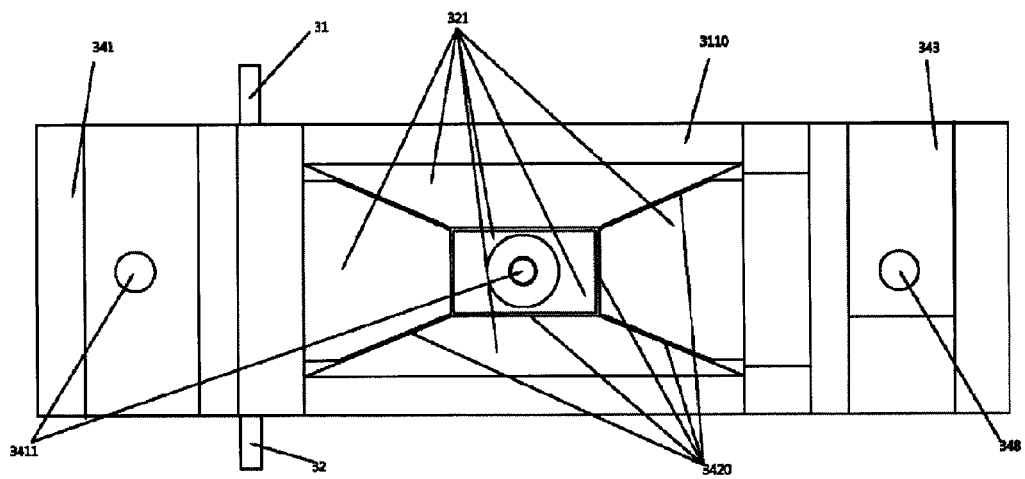
FIG. 20 is the bottom upward view of the bottom of FIG. 18.

During the running, the aluminum-air battery system outputs electric energy outward by consuming the aluminum alloy electrodes and oxygen in the air. During the running of the battery system, aluminum alloy electrodes opposite to the surfaces of the air electrodes will dissolve continuously. Therefore, running time of the aluminum-air battery system after one-time supplementation of aluminum alloy electrodes can be prolonged by increasing the thickness of the aluminum alloy electrodes opposite to the surfaces of the air electrodes in the single batteries 34, namely adopting cylindrical aluminum alloy electrodes. Refer to FIG. 18 to FIG. 20, the other preferable embodiment of the invention is adopting battery system structure which is similar to that of the previous embodiment, differences between which are: bottoms of the battery reaction chamber 342 of the single batteries 34 is the big-end-up prism-shaped cavity with n sides, both sides and bottom of the prism-shape cavity are embedded with air electrodes 321; interior of the battery reaction chamber is embedded with n prism-shaped aluminum alloy electrodes 311, which are in one-to-one correspondence with the n air electrodes 321 of the prism-shaped side wall under the battery reaction chamber 342, forming multi group electrode groups; all the aluminum alloy electrodes 311 face one side of the corresponding air electrodes 321, with cant structure parallel to the air electrodes 321. Where: n≥1. The aluminum alloy electrodes 311 and air electrodes 321 are respectively in series or/parallel, then respectively electrically connected to the aluminum alloy collector plates 31 and air electrode collector plates 32. In the embodiment, 4 prism-shaped aluminum alloy electrodes are taken as example: 4 aluminum alloy electrodes whose bottoms are slant prism-shaped are placed in the battery reaction chamber 342 of the single batteries 34, the battery reaction chamber 342 of the single batteries 34 is the big-end-up prism-shaped cavity with n sides, both sides and bottom surfaces of the prism-shaped cavity are embedded with air electrodes 321; air electrodes 321 are located on the peripheral and bottom frame of the shell 3420 of the single battery reaction chamber, locating frame 3110 on the battery reaction chamber 342 is for fixing the 4 prism-shaped aluminum alloy electrodes 311, the aluminum alloy electrodes 311 are located inside of the battery reaction chamber 342, and keep appropriate space with the air electrodes 321 at the outer side of the battery reaction chamber 342. Support frames 3112 of the aluminum alloy electrodes 311 are at the bottom of the aluminum alloy electrodes 311, supporting the aluminum alloy electrodes 311. In this embodiment, electrolyte flowing way is the same with that of the pervious embodiment. In practical application, quantity, position and shape of the air electrodes 321 in the single batteries 34 can be different as required, and quantity, position and shape of the aluminum alloy electrodes 311 will also change correspondingly, so as to be fit.

What is claimed is:

1. A high-power aluminum-air battery system, comprising single aluminum-air batteries, wherein at least two of the single aluminum-air batteries are electrically connected in series or parallel to form a battery pack; a bottom of the battery pack is provided with two liquid flow handling chambers, and an upward side of the battery pack is provided with a liquid distributing apparatus; the single aluminum-air batteries are interlinked with the liquid flow handling chambers via respective liquid outlet pipes; the liquid flow handling chambers are interlinked with a pump liquid chamber via their respective liquid transmission pipes; the pump liquid chamber is interlinked with a liquid flow pump via a liquid sucking pipe, and a liquid delivery pipe of the liquid flow pump is interlinked with the liquid distributing apparatus; the liquid distributing apparatus is interlinked with the single aluminum-air batteries under the liquid distributing apparatus via liquid inlet pipes; the high-power aluminum-air battery system is configured to allow switches of the liquid outlet pipes which are connected with the liquid flow handling chambers respectively to be adjusted while the high-power aluminum-air battery system is running, to control electrolyte of the battery pack to flow into one of the two liquid flow handling chambers alternately, so that the electrolyte circulates among one of the two liquid flow handling chambers, the pump liquid chamber, the liquid distributing apparatus and the battery pack, while the other liquid flow handling chamber is in the process of electrolyte standing and sediment sedimentation treatment; electric energy output ends at an outer side of the battery pack are respectively interlinked with air electrode collector plates and aluminum alloy electrode collector plates of the battery pack, and are configured to supply power outward; wherein each of the single batteries has a cavity structure, comprising a liquid inlet cutting chamber, a battery reaction chamber, and a liquid outlet cutting chamber separate from each other; the high-power aluminum-air battery system is configured to allow electrolyte in the liquid distributing apparatus to flow into the liquid inlet cutting chamber via the liquid inlet pipes, then flow into the battery reaction chamber via the liquid inlet pipe under the liquid inlet cutting chamber; a rotatable liquid inlet cutter comprising a lattice structure is provided at an upward side of the liquid inlet cutting chamber configured to allow inflow of electrolyte; electrolyte flowing out from the liquid inlet pipes can be infused onto the first lattice structure of the rotatable liquid inlet cutter, cut off by the grid of the rotatable liquid inlet cutter and then allowed to flow into the liquid inlet cutting chamber;

at least one side wall of the battery reaction chamber is air electrodes, constituting an electrode group with aluminum alloy electrodes in the battery reaction chamber; the aluminum alloy electrodes are embedded in the locating slot of the battery reaction chamber; the aluminum alloy electrodes and air electrodes are electrically connected with the aluminum alloy electrode collector plates and air electrode collector plates of the battery pack respectively, wherein the high-power aluminum-air battery system is configured to allow hydrogen produced to enter a hydrogen transmission channel of the liquid distributing apparatus via an upper exposure of the battery reaction chamber and to be exhausted outward, the battery reaction chamber and the liquid outlet cutting chamber are separated by an inner separation wall, wherein an upper end of the inner separation wall is retained with an overflow slot enabling the two chambers to be interlinked; the liquid outlet cutting chamber is separated by a horizontal partition into an upper zone and a lower zone: a confluence zone and a liquid outlet zone, the horizontal partition is set with a confluence pipe which can pass through downward; electrolyte in the battery reaction chamber flows into the confluence zone via the overflow slot, and flows into the liquid outlet zone under the confluence zone via the confluence pipe; a bottom of the liquid outlet zone is provided with the liquid outlet pipe, which is interlinked with the liquid flow handling chambers, a rotatable liquid outlet cutter comprising a second lattice structure is provided in the liquid outlet zone and under an orifice of the confluence pipe, electrolyte flows out from the confluence pipe is infused onto the second lattice structure of the liquid outlet cutter, namely, the electrolyte is cut off by the second lattice structure of the liquid outlet cutter and flows into the liquid outlet zone.

2. The system of claim 1, wherein the structures of the liquid handling chambers are symmetrical; the liquid handling chambers are respectively set with heating or cooling pipes for heating or cooling electrolyte.

3. The system of claim 1, wherein lower parts of the liquid flow handling chambers are respectively set with sediment drain pipes with switches, bottoms of the shells of the liquid flow handling chambers are set with tilting structures enabling the sediment to slide to one side of the sediment drain pipes.

4. The system of claim 1, wherein the pump liquid chamber is set with a leaner inlet pipe and a leaner outlet pipe with switches, for washing an interior of the aluminum-air battery system.

5. The system of claim 1, wherein the liquid distributing apparatus comprises a liquid distributing tank, an upper cover which matches with the liquid distributing tank, and a liquid level display which is at an outer side of a shell of the liquid distributing tank for displaying a level status of liquid in the liquid distributing tank; the liquid distributing tank is of a bathtub construction, a central part of the liquid distributing tank is provided with up and down pass-through hollow windows, and a periphery of the liquid distributing tank is a tank channel; liquid inlet pipes interlinked with the single batteries are located at a bottom of the tank channel; the liquid delivery pipe of the liquid flow pump is interlinked with the tank channel; a lower surface of the upper cover is provided with a circular convex ridge which matches with the hollow windows of the liquid distributing tank; the high-power aluminum-air battery system is configured such that, when the upper cover covers the liquid distributing tank, the convex ridge covers or is embedded into the hollow windows of the liquid distributing tank, constituting a hydrogen output channel; a voltage-current adjuster and a voltage-current display at an outer side of the liquid distributing apparatus are linked respectively with the aluminum alloy electrode collector plates and air electrode collector plates of the battery pack under the liquid distributing tank via conductively connected parts in the liquid distributing tank; the high-power aluminum-air battery system is configured to allow hydrogen produced by the single batteries to exhaust from the air outlet which is set on the upper cover via a hydrogen transmission channel constituted by hollow windows of the liquid distributing tank and the convex ridge of the upper cover.

6. The system of claim 1, wherein a structure of the lower part of the battery reaction chamber is a big-end-up prism with n sides, both sides and under the surface of the prism are embedded with air electrodes; the battery reaction chamber is embedded with n prism-shaped aluminum alloy electrodes, which are in one-to-one correspondence with n air electrodes of all side walls of the lower part of the battery reaction chamber, forming multi group electrode groups; the aluminum alloy electrodes face one side of the air electrodes corresponding to them, which is a cant structure parallel to the air electrodes; and n≥1.

7. The system of claim 1, wherein both of the liquid inlet cutter and the liquid outlet cutter are provided with a revolving shaft, which can turn on their own under impact of electrolyte, so as to cut off an electrolyte flow that passes through; or the both are controlled by circuit to turn on or off, so as to cut off the electrolyte flow that passes through.

8. The system of claim 1, wherein ports of liquid outlet pipes of the liquid flow handling chambers are set with liquid flow baffles on which several connecting poles are connected with the liquid outlet pipes, all connecting poles have a space to each other, and electrolyte in the liquid outlet pipes is allowed to flow out from gaps among the connecting poles.

9. The system of claim 1, wherein there is one or multi groups of aluminum alloy electrodes and air electrodes in the battery reaction chamber; when it occurs to the latter case, aluminum alloy electrodes and air electrodes are respectively electrically connected in series or parallel, then electrically connected to the aluminum alloy electrode collector plates and air electrode collector plates respectively.

10. The system of claim 1, wherein a leaner outlet pipe is connected to the liquid inlet pipe between the liquid inlet cutting chamber and a battery reaction chamber, and the leaner outlet pipe is installed with a leaner outlet switch.

11. The system of claim 1, wherein the liquid outlet pipes of the liquid outlet cutting chamber are also connected with a leaner outlet pipe, and the leaner outlet pipe is installed with a leaner outlet switch.

* * * * *